Patented Aug. 10, 1948

2,446,796

UNITED STATES PATENT OFFICE 2,446,796

SUBSTITUTED PYRIDINIUM AND PIPERIDINIUM COMPOUNDS

Marcus G. Van Campen, Jr., Wyoming, and Robert S. Shelton, Mariemont, Ohio, assignors to The Wm. S. Merrell Company, Cincinnati, Ohio, a corporation of Delaware No Drawing. Application February 4, 1946, Serial No. 645,482

14 Claims. (Cl. 167—33)

This invention relates to certain quaternary ammonium compounds that are especially adapted to be used as the active ingredient in compositions for counteracting micro-organisms generally referred to as germs, including bacteria, fungi and the like, and especially in compositions suitable for general use on inanimate objects as well as in the treatment of wounds, skin and mucous surfaces, etc. Although compositions incorporating the novel compounds of our invention will most often be used as germicides, i. e. for killing of such micro-organisms, they may also be used to inhibit growth of such organisms ("bacteriostatic" action) or to render germs more or less innocuous by a partial or complete nullification of their harmful effects or by inhibition of their normal activities which produce the harmful effects. We refer to these various related uses generally as germ-counteracting.

The present application is a continuation-in-part of our co-pending application Ser. No. 500,340, filed August 28, 1943. The relationship between the present application and our co-pending parent application is further explained hereafter.

Prior to the invention of our co-pending parent application, Ser. No. 500,340, it had been known that quaternary ammonium compounds of the type having one higher molecular aliphatic constituent on the ammonium nitrogen exhibit germicidal and bacteriostatic effect. In the prior patent of one of us, No. 2,295,504, it was disclosed that within this broad class of compounds unusual activity is exhibited by those compounds having one relatively high molecular weight constituent of 16 carbon atoms on the ammonium nitrogen. Surprisingly, as there shown, although a change of two or more in the number of carbon atoms in the high molecular weight substituent resulted in a very significant change in the activities of the compound, no similar correlation was found between activity and the size and nature of low molecular weight substituents in the compound. Thus such different compounds as cetyl trimethyl ammonium salts, cetyl tributyl ammonium salts, cetyl methyl piperidinium salts and cetyl pyridinium salts were all strikingly superior to the lauryl or stearyl homologue corresponding to any of these.

However, as disclosed in our parent application, Serial No. 500,340, in the case of the heterocyclic ammonium compounds, when a side chain is substituted on a carbon atom of the heterocyclic nucleus the length of the side chain affects the activity of the compound in the same manner as, and modifies the critical effect of, the substituent on the nitrogen atom. Thus N-cetyl substituted pyridinium and piperidinium compounds still exhibit relatively high activity when unsubstituted and when methyl or ethyl groups are substituted on a carbon atom of the heterocyclic nucleus and such ethyl-substituted compounds are the most active of the cetyl ammonium compounds, but further increases in the length of the side chain result in progressive decrease of the activities of the cetyl ammonium compounds. On the other hand, quaternary compounds with lower molecular weight substituents on the nitrogen atom, which compounds would be greatly inferior if otherwise unsubstituted become equal to and in some cases even better than the cetyl ethyl compounds when appropriate side chains are attached on the carbon atoms of their nuclei.

In our parent application, Serial No. 500,340, it is disclosed that optimum activity is achieved when the sum of the carbon atoms of the substituent chains is at least 16 and less than 19. More particularly, study and comparison of many of such compounds has shown conclusively: First that the peak of activity does not depend alone upon a single high molecular weight constituent but rather upon the sum of the carbon atoms in the substituents on the ammonium nitrogen, and in the substituent side chains having at least two carbon atoms that are attached to a carbon atom or atoms in the nucleus; secondly, the peak activity occurs in the range where the sum of the carbon atoms is 16 to 18, except that when the substituent chains are of approximately equal length, the peak usually appears at 18 or 19 or in the range of 17 to 19, inclusive. Reference is also made to applicants' copending application Ser. No. 603,269 which contains related subject matter.

The present continuation-in-part application is intended to cover this latter group of compounds; i. e. quaternary ammonium compounds having substituents attached to the ammonium nitrogen and a carbon atom of the nucleus and wherein each of these substituents has at least 7 and less than 11 carbon atoms and the sum of the carbon atoms of the substituent groups is in the range 17 to 19 inclusive. This group of compounds possesses in common with some of the other compounds described in our parent application a number of surprising advantages. In the first place, quaternary ammonium germicides generally show a substantial reduction of germicidal activities at temperatures appreciably below body temperature, whereas the compounds of this group retain their activities to a remarkable degree at room temperatures.

Moreover, the activity of the compounds as against Gram-negative organisms (represented for example by *E. typhosa*) is more nearly abreast of the activity as against Gram-positive organisms (represented by *Staph. aureus*), although with quaternary ammonium compounds in general activity against the former type of organism is substantially lower. The compounds of the present invention are usually at least as effective against the Gram-negative type as against the Gram-positive organisms and often are more active. Inasmuch as the organisms of the Gram-negative type are often considered to be of greater importance in the disinfection of inanimate objects, the relatively high activity as against these organisms and especially the maintained activity at lower temperatures are of great practical importance.

Due to the extraordinarily high activity of these compounds against pathogenic organisms at relatively low temperatures and to their low toxicity to the human organism, higher plants and animals, these compounds have been found particularly valuable for sterilization of drinking water, leafy vegetables and other foods and beverages which are likely to carry infection and are to be drunk or eaten without further cooking.

Likewise, due to the properties mentioned above and to the hygroscopic nature of these compounds they are particularly advantageous for hospital and sick room sanitation. By washing room surfaces and particularly bed linens and bed clothing with a solution of these compounds, the surfaces are rendered antiseptic. By allowing a film of such solutions to remain on the surfaces air-borne germs which may accumulate thereon are rendered innocuous and the spread of infection by stirring up of such germs during cleaning, bed-making, etc., can be largely controlled. Since these compounds are also soluble in oil and are powerful emulsifying agents they may be applied for this purpose in oil emulsion, the oil serving more effectively to catch and hold dust particles.

These same properties make the compounds of the present invention very good for preservation of such substances as fruits, vegetables and other foods, clothing, shoes, wood and various other organic substances against attack by micro-organisms including insects and their larvae.

A particular advantage especially characteristic of the compounds of the group covered by this continuation-in-part application, arises out of the fact that these compounds exhibit extraordinarily high immunity to the presence of serum and impurities which tend to inhibit the activity of most germicides. This immunity to the presence of serum is illustrated by the data contained in the following table.

*Critical killing dilution against E. typhosa at 20° C. with 10% serum*

| Compound | C. K. D. |
|---|---|
| N-Octyl-4-n-nonylpyridinium Bromide | 1:27,000 |
| N-Nonyl-4-n-nonylpyridinium Bromide | 1:17,750 |
| N-n-Decyl-4-(2-methyloctyl) pyridinium Bromide | 1:3000 |
| N-n-Decyl-4-n-nonyl pyridinium Bromide | 1:9000 |
| N-n-Decyl-4-(5-nonyl) pyridinium Bromide | 1:4750 |
| N-n-Nonyl-4-(2-methyloctyl) pyridinium Bromide | 1:10,000 |
| N-n-Decyl-2-(2-methyloctyl) pyridinium Bromide | 1:4100 |
| N-n-Octyl-2-(2-methyloctyl) pyridinium Bromide | 1:10,500 |
| N-n-Octyl-4-(2-methyloctyl) pyridinium Bromide | 1:7500 |

The units of C. K. D. in the above table are parts by weight of active material per part of water, i. e. the first compound listed retains its ability to kill all the designated organism under the designated conditions when present to the extent of only one part in 27,000 parts of water. The figures given demonstate in striking fashion the ability of these compounds to retain their activity in the presence of serum, even at relatively low temperatures. It will of course be recognized that under less rigorous conditions these compounds may exhibit a considerably higher C. K. D.

The figures for C. K. D. given in the foregoing table were obtained by using a standardized accepted method with standardized strains of organisms and are believed to be adequate as a basis for forming conclusions as to the comparative effectiveness of different compounds but it should be remembered that these tests are made on live organisms and it has been observed that the actual C. K. D. figures varied somewhat with variations in the nutrient media, such as occur in successive batches obtained under the same specifications and from carefully controlled sources. Likewise, variations of C. K. D. figures will occur with variations in the strain which can not be eliminated when one is dealing with living organisms.

In general, the compounds of the present invention may be prepared by conventional methods or by modifications of conventional methods. The following procedure illustrates one general method by which these compounds may be prepared. Equimolar quantities of a substituted pyridine having a side chain containing 7 to 11 carbon atoms and an alkyl halide containing 7 to 11 carbon atoms are mixed, placed in a closed vessel and heated to 75° C. to 85° C. The heating is continued until the reaction is substantially complete, the extent to which the reaction has proceeded being determined by analyzing a weighed sample of the product for the halide ion. Usually a period of from one to ten days is required to complete the reaction.

The product as thus prepared may be thoroughly washed with cold anhydrous ether and used as such or may be further purified. For example, it may be desirable to remove hydrohalides of the substituted pyridine which are formed in varying amounts as by-products in the reaction. To effect removal of such hydrohalides, the reaction product may be dissolved in methanol to which a few drops of phenolphthalein are added. The solution is titrated with a base until a dark color is formed. This color change is sharp and is not due to the indicator alone. At this point the solution is decolorized by treatment with activated charcoal and the methanol is removed on a steam bath with the aid of a jet of air, the last traces of methanol being removed under vacuum. The residue is dissolved in boiling absolute ether to which is added enough dry acetone to cause all of the material to dissolve. The amount of acetone to be added varies with the individual compound. The resulting solution is filtered and then thoroughly chilled, whereupon the desired product precipitates from the solution. The products as thus prepared are hygroscopic in varying degrees. Analysis of the products for the halide ion shows that the products as thus produced are substantially pure quaternary ammonium salts.

In order to point out more fully the nature of the present invention and illustrate the method of preparation of typical members of the group referred to above, the following specific examples are given.

N-n-octyl-4-n-nonyl-pyridinium bromide

To 7.0 grams (0.034 mole) of 4-n-nonyl-pyridine 6.6 grams (0.034 mole) of n-octyl bromide were added. The reactants were placed in a small stoppered bottle in an oven maintained at 80° C. and allowed to remain for sixty-six hours. Analysis of a weighed sample indicated the reaction was quantitatively complete. Consequently the product was directly re-crystallized from a mixture of absolute ether and acetone. The white crystalline product melted at 113° C. to 115° C. and was hygroscopic. It was found that one part of the material was soluble in 225 parts of water at ordinary temperatures.

N-n-nonyl-4-n-nonyl-pyridinium bromide

To 7.0 grams (0.034 mole) of 4-n-nonyl-pyridine 7.1 grams (0.034 mole) of n-nonyl bromide were added and the mixture was maintained in an oven at 80° C. for sixty-six hours. Analysis of a weighed sample showed the reaction to be nearly complete. The product was dissolved in methanol and the purification procedure as described above was followed. The product after purification was re-crystallized from a mixture of absolute ether and acetone. The resulting material melted at 119° C. to 120° C. and was hygroscopic. It was found that one part of the material dissolved in 375 parts of water at ordinary temperatures.

N-methyl-N-octyl-4-n-nonyl-piperidinium bromide

Equimolar quantities of N-methyl-4-n-nonyl piperidine and n-octyl bromide were mixed and heated at 80° C. for about a week. The product was crystallized from a mixture of ether and acetone and was found to be sparingly soluble in water.

For ordinary germicidal and disinfecting purposes the compounds may be made up in water solutions of a strength, for example, 1:1,000 and diluted appropriately for the particular use to which they are to be put, or they may be furnished in crystalline form or more concentrated solution for appropriate dilution at the time of use. For treating hospital and sick room floors, walls, furniture and linen and patients' bed clothing, etc., an emulsion may be made with any desired strength, e. g., 1:500 of the quaternary ammonium compound, advantageously in accordance with the Patent No. 2,372,159.

For sterilization of drinking water, the compounds of our invention are advantageously made up in tablets of appropriate size for the container in which the water is to be used. In view of the small amount of active compound required for such sterilization, and in order to improve tableting and dissolution, it is ordinarily desirable to add a suitable diluent, for example, lactose. As one example, 45 parts of the N-octyl-4-n-nonyl pyridinium bromide according to our invention is mixed with 50 parts of lactose and 5 parts of sugar syrup and this mixture is then formed into tablets of suitable size for dissolving in a canteen, jug, water barrel, or other container in which the water is to be sterilized, to give an effective sterilizing strength of the active ingredients of say 1:10,000.

These compounds may also be used in place of other quaternary ammonium compounds in various known pharmaceutical compositions and germicidal and disinfectant preparations. In particular these compounds may be used in any of the formulae set forth below. They may be used in aqueous or oleaginous compositions as well as in organic solvents. They may be used in presence of acids or alkalies and with flavoring, coloring, therapeutic or many other types of ingredients. They may be used as indicated above for sterilization, or disinfection and they may be used for preservation of foods, clothing, wood, adhesives, biological materials, and in general wherever decomposition or putrefaction might occur.

Illustrative of such compositions are:

| Mouth wash: | Per cent |
|---|---|
| Germicide | 0.01–0.02 |
| Boric acid | 1 |
| Alcohol | 20–30 |
| Flavor | As required |
| Color | As required |
| Water q. s. | 100 |

| Skin antiseptic: | Per cent |
|---|---|
| Germicide | .1–.5 |
| Dye | As required |
| Alcohol | 40–50 |
| Water q. s. | 100 |

| Cough drops: | Per cent |
|---|---|
| Germicide | .1 |
| Aromatics | As required |
| Sugar q. s. | 100 |

| Lipstick: | Per cent |
|---|---|
| Germicide | .1 |
| Beeswax | 33 |
| Lard | 12 |
| Castor oil | 41 |
| Lanolin | 4 |
| Water | 4 |
| Perfume and color q. s. | As required |

| Dentrifice: | Per cent |
|---|---|
| Germicide | 0.1 |
| $CaCO_3$ | 50 |
| Tricalcium phosphate | 25 |
| Magnesium carbonate (or hydroxide) | 24 |
| Sugar saccharin and flavor | 0.9 |
| Wetting agent | 0.1 |

| Nose drops: | Per cent |
|---|---|
| Germicide | 0.03 |
| Ephedrine $SO_4$ | 1 |
| Dextrose | 4 |
| Water q. s. | 100 |

| Germicidal ointment: | Per cent |
|---|---|
| Germicide | 0.2 |
| Petrolatum | 69 |
| Lanolin | 25 |
| Water | 6 |

| Antiseptic medicated skin cream: | Per cent |
|---|---|
| Germicide | 0.1 |
| Propylene glycol monostearate | 10.0 |
| Glycerin | 5.0 |
| Water | 85.0 |

| Lubricating jelly: | Per cent |
|---|---|
| Germicide | 0.1 |
| Tragacanth | 1.0 |
| Glycerin | 15.0 |
| Water | 100 |

| Hand cleanser: | Per cent |
|---|---|
| Germicide | .5 |
| Perfume | As required |
| Glycerine | 5.0 |
| Water q. s. | 100 |

These, of course, are only examples; and it should be understood that their proportions can be varied substantially and that numerous other types of compositions are within the scope of the invention.

In the foregoing description it has been pointed out that the compounds of the present invention may be advantageously incorporated in germ-counteracting compositions and the desirable features of germ-counteracting compositions including the present compounds have been stressed at some length. However, it is believed that these compounds are novel per se and adapted to be used in other ways than as constituents of a germicide.

We claim:

1. A germ-counteracting composition which comprises as the essential germ-counteracting ingredient thereof a heterocyclic quaternary ammonium compound in which the heterocyclic nucleus is a six-membered ring of five carbon atoms and the ammonium nitrogen atom, said ammonium nitrogen and one of the carbon atoms of the nucleus each having attached thereto an aliphatic radical of at least seven and less than eleven carbon atoms, the sum of the carbon atoms of said radicals being at least seventeen and less than twenty, said quaternary ammonium compound being present in said composition to the extent of between 0.1 and 0.5% by weight.

2. A germ-counteracting composition which comprises as the essential germ-counteracting ingredient thereof a heterocyclic quaternary ammonium compound in which the heterocyclic nucleus is a six-membered ring of five carbon atoms and the ammonium nitrogen atom, said ammonium nitrogen and the carbon atom in the "4" position of the nucleus each having attached thereto an aliphatic radical of at least seven and less than eleven carbon atoms, the sum of the carbon atoms of said radicals being at least seventeen and less than twenty.

3. A germ-counteracting composition which comprises as the essential germ-counteracting ingredient thereof a heterocyclic quaternary ammonium compound in which the heterocyclic nucleus is a six-membered ring of five carbon atoms and the ammonium nitrogen atom, said ammonium nitrogen atom and the carbon atom in the "2" position of the nucleus each having attached thereto an aliphatic radical of at least seven and less than eleven carbon atoms, the sum of the carbon atoms of said radicals being at least seventeen and less than twenty.

4. A germ-counteracting composition which comprises as the essential germ-counteracting ingredient thereof a heterocyclic quaternary ammonium compound in which the heterocyclic nucleus is a six-membered ring of five carbon atoms and the ammonium nitrogen atom, said ammonium nitrogen having attached thereto an aliphatic radical of at least seven and less than eleven carbon atoms and one of the carbon atoms of said nucleus having attached thereto an aliphatic radical of nine carbon atoms, the sum of the carbon atoms of said radicals being at least seventeen and less than twenty, said quaternary ammonium compound being present in said composition to the extent of between 0.1 and 0.5% by weight.

5. A germ-counteracting composition which comprises as the essential germ-counteracting ingredient thereof a heterocyclic quaternary ammonium compound in which the heterocyclic nucleus is a six-membered ring of five carbon atoms and the ammonium nitrogen atom, said ammonium nitrogen having attached thereto an aliphatic radical of at least seven and less than eleven carbon atoms and the carbon atom in the "4" position of said nucleus having attached thereto an aliphatic radical of nine carbon atoms, the sum of the carbon atoms of said radicals being at least seventeen and less than twenty.

6. A germ-counteracting composition which comprises as the essential germ-counteracting ingredient thereof a heterocyclic quaternary ammonium compound in which the heterocyclic nucleus is a six-membered ring of five carbon atoms and the ammonium nitrogen atom, said ammonium nitrogen atom having attached thereto an aliphatic radical of at least seven and less than eleven carbon atoms and the carbon atom in the "2" position of said nucleus having attached thereto an aliphatic radical of nine carbon atoms, the sum of the carbon atoms of said radicals being at least seventeen and less than twenty.

7. A germ-counteracting composition which comprises as the essential germ-counteracting ingredient thereof a N-octyl-4-n-nonylpyridinium compound, said compound being present in said composition to the extent of between 0.1 and 0.5% by weight.

8. A germ-counteracting composition which comprises as the essential germ-counteracting ingredient thereof a N-nonyl-4-n-nonylpyridinium compound, said compound being present in said composition to the extent of between 0.1 and 0.5% by weight.

9. A germ-counteracting composition which comprises as the essential germ-counteracting ingredient thereof a N-n-nonyl-4-(2-methyloctyl) pyridinium compound, said compound being present in said composition to the extent of between 0.1 and 0.5% by weight.

10. As a new composition of matter, a heterocyclic quaternary ammonium compound in which the heterocyclic nucleus is a six-membered ring of five carbon atoms and the ammonium nitrogen atom, said ammonium nitrogen and one of the carbon atoms of said nucleus each having attached thereto an aliphatic radical of at least seven and less than eleven carbon atoms, the sum of the carbon atoms of said radicals being at least seventeen and less than twenty.

11. As a new composition of matter, a heterocyclic quaternary ammonium compound in which the heterocyclic nucleus is a six-membered ring of five carbon atoms and the ammonium nitrogen atom, said ammonium nitrogen atom having attached thereto an aliphatic radical of at least seven and less than eleven carbon atoms and one of the carbon atoms of said nucleus, having attached thereto an aliphatic radical of nine carbon atoms, the sum of the carbon atoms of said radicals being at least seventeen and less than twenty.

12. As a new composition of matter, a N-octyl-4-n-nonylpyridinium compound.

13. As a new composition of matter, a N-nonyl-4-n-nonylpyridinium compound.

14. As a new composition of matter, a N-n-nonyl-4-(2-methyloctyl)pyridinium compound.

MARCUS G. VAN CAMPEN, Jr.
ROBERT S. SHELTON.

REFERENCES CITED

The following references are of record in the file of this patent:

FOREIGN PATENTS

| Number | Country | Date |
|---|---|---|
| 479,925 | Great Britain | May 11, 1936 |